US006799084B2

(12) United States Patent
Grobler

(10) Patent No.: US 6,799,084 B2
(45) Date of Patent: Sep. 28, 2004

(54) DATA VENDING SYSTEM

(76) Inventor: Benjamin Filmalter Grobler, 92 Southpansberg Rd., Riviera, Pretoria 0084 (ZA)

(*) Notice: Subject to any disclaimer, the term of this patent is extended or adjusted under 35 U.S.C. 154(b) by 0 days.

(21) Appl. No.: 09/773,170

(22) Filed: Jan. 31, 2001

(65) Prior Publication Data

US 2001/0027357 A1 Oct. 4, 2001

Related U.S. Application Data

(63) Continuation-in-part of application No. PCT/ZA99/00056, filed on Jul. 29, 1999.

(30) Foreign Application Priority Data

Jul. 31, 1998 (ZA) .............................................. 98/6868

(51) Int. Cl.[7] .............................................. G07F 17/00
(52) U.S. Cl. ...................... 700/235; 700/237; 700/241; 700/234
(58) Field of Search ................................ 700/237, 241, 700/235, 234

(56) References Cited

U.S. PATENT DOCUMENTS

| 4,528,643 | A | | 7/1985 | Freeny, Jr. | |
|---|---|---|---|---|---|
| 4,674,055 | A | * | 6/1987 | Ogaki et al. ................. | 364/479 |
| 4,695,903 | A | * | 9/1987 | Serap .......................... | 358/355 |
| 4,725,977 | A | * | 2/1988 | Izumi et al. ................. | 364/900 |
| 4,787,050 | A | * | 11/1988 | Suzuki ........................ | 364/479 |
| 4,789,907 | A | * | 12/1988 | Fischetti et al. ............ | 360/33.1 |
| 5,418,654 | A | * | 5/1995 | Scheffler ..................... | 360/13 |
| 5,625,562 | A | * | 4/1997 | Veeneman .............. | 364/479.05 |
| 5,757,908 | A | * | 5/1998 | Cooper et al. ................. | 380/4 |
| 5,758,069 | A | * | 5/1998 | Olsen ..................... | 395/187.01 |
| 5,790,177 | A | * | 8/1998 | Kassatly ....................... | 348/13 |
| 5,812,643 | A | * | 9/1998 | Schelberg, Jr. et al. .. | 379/93.12 |
| 5,860,362 | A | * | 1/1999 | Smith .......................... | 101/494 |
| 5,902,115 | A | * | 5/1999 | Katayama ................... | 434/307 |
| 5,918,213 | A | * | 6/1999 | Bernard et al. ............... | 705/26 |
| 5,993,216 | A | * | 11/1999 | Stogner ....................... | 434/29 |
| 6,086,380 | A | * | 7/2000 | Chu et al. ................... | 434/307 |
| 6,118,860 | A | * | 9/2000 | Hillson et al. .............. | 379/155 |
| 6,134,593 | A | * | 10/2000 | Alexander et al. .......... | 709/229 |
| 6,587,404 | B1 | * | 7/2003 | Keller et al. ............. | 369/20.06 |

FOREIGN PATENT DOCUMENTS

| EP | 0 649 121 A2 | 4/1995 | |
|---|---|---|---|
| EP | 852349 A2 | * 7/1998 | ............. G06F/1/00 |
| GB | 2 305 339 A | 4/1997 | |
| WO | WO97/30425 | 8/1997 | |

* cited by examiner

*Primary Examiner*—Donald P. Walsh
*Assistant Examiner*—Michael E. Butler
(74) *Attorney, Agent, or Firm*—Akerman Senterfitt

(57) ABSTRACT

The invention provides a data vending system 10 including the storing data such as digitised music and/or video and/or computer programs on one or more main computer i.e. the data depot 12 and dispensing the data to a uniquely identifiable data carrier 30. The data on the data depot 12 includes a database which maintains owner and/or possessor records for each said data carrier 30, the data being selected from the group including ownership or possession history of the data carrier, personal details of the past and present owner and/or possessor of the data carrier, demographic data about the user/owner of the data carrier, data recorded onto the data carrier at an authorised data dispensing device (either cumulatively or periodically, by title, by artist, etc), data rented and the rental period (either cumulatively or periodically, by title, by artist, etc), the user's normal requirements, the user's payment records, royalties paid to the copyright owner by the user, and favourite data of the user.

8 Claims, 1 Drawing Sheet

DATA VENDING SYSTEM

CROSS REFERENCE TO RELATED APPLICATIONS

This application is a continuation-in-part of PCT/ZA99/00056. Filed Jul. 29, 1999.

FIELD OF THE INVENTION

This invention relates to a data vending system.

BACKGROUND TO THE INVENTION

The inventor is aware that presently copyright royalty losses are incurred due to unauthorised copying of data, such as music, videos, computer programs, and the like. This copying usually takes the form of one or more unauthorised copies being made from an original or authorised copy.

One of the reasons for the unauthorised copying is that consumers are unable to purchase just the data they want, and are often offered either a bundle including the data they require or they must do without.

A further reason for the copying is that recording media are freely available and that any person may record data on such media, without prior authorisation by the copyright owner or his licensee(s).

Yet a further reason for the unauthorised copying is the availability of data of the type mentioned above over the internet, for example, from music sites which allow the downloading of particular tracks of music either for free or for payment. Once the music has been downloaded from the internet by a user neither the internet site operator nor the owner of the copyright in such data has any control over its further copying.

In addition to the above problems, the authorised end user is also limited by present data distribution systems in that if the data is lost or damaged the authorised user has to again purchase an authorised copy from the copyright owner or a licensed vendor. This problem is particularly acute with data carried on magnetic or optical media such as tapes, diskettes, compact disks (CD's) and Digital Video Disks (DVD's), which are prone to loss and/or damage.

The inventor is aware of EP 0 649 121 A2 to international Business Machines Corporation. This system provides for distribution of remotely stored digitised information, which information may be previewed in real time, and product incorporating selected digitised information can be manufactured on-site and within a short response time to a customers request at a point of sale location. The system also provides management reporting and a marketing system collects and maintains data useful to the retailer and the content owners such as record companies. This system, however, does not address the end user's ownership of digitised data nor the license held by the end user of the digitised data as the system is supplier orientated and not end user orientated. There is thus little incentive for a user to accept the system as a sole unified information sales system.

SUMMARY OF THE INVENTION

Thus, according to a first aspect of the invention, there is provided a data vending system including:
a data depot for storing one or more data type selected from the group comprising digitised or analogue music, video, games, information, and computer programs;
a data dispensing device in communication with the data depot;
a uniquely identifiable recordable data carrier configured for recording data from the data dispensing device; and
a database for keeping a record of the data recorded by a user onto said data carrier, at least a part of which database is stored remotely from said data carrier.

The database may also maintain owner and/or possessor records for each said data carrier selected from the group including ownership or possession history of the data carrier, personal details of the past and present owner and/or possessor of the data carrier, demographic data about the user/owner of the data carrier, data recorded onto the data carrier at an authorised data dispensing device (either cumulatively or periodically, by title, by artist, etc), data rented and the rental period (either cumulatively or periodically, by title, by artist, etc), the user's normal requirements, the user's payment records, royalties paid to the copyright owner by the user, and favourite data of the user.

The database may link the record of the user to any number of said data carriers and to the data recorded onto said data carriers thereby to collate all data recorded by the user onto any number of data carriers.

The database may be stored in whole or in part on the data depot, on the data dispenser, on the data carrier, or on a combination of any of the aforementioned i.e. a decentralised database.

The data depot may include a computer located at a remote location on which data to be vended is stored or from which data to be vended is routed.

The data depot may have the data stored thereon indexed. The indexing may be by index number, name of author, name of producer, title, content, cost, duration, theme, or the like.

The index may be searchable from the data dispensing device and/or from the data carrier.

The data depot may be a store of digitised or analogue music, video, games, information, or computer programs.

The data dispensing device may be in the form of a computer terminal in data transfer communication with the depot. Conveniently such data transfer may be by dedicated data lines, optic fibre cables, telephone lines, satellite link-up, radio transmission, or the like.

The computer terminal may be provided with localised data storage for storing an index of available data. The index may be a copy of a portion of the data depot index at a given time.

The index on the computer terminal may be updated periodically from the data depot, typically when data is transferred between the computer data depot and the computer terminal to complete a data vending transaction.

The computer terminal may be provided with data writing means for writing data to a data carrier. The computer terminal may be configured to download data from the depot and transfer the data to the data carrier with or without storing it locally for later retrieval.

The computer terminal may include payment means for processing payment of a transaction amount for the data vending transaction.

A royalty payment to the copyright owner and/or licensee may be included in the transaction amount, which royalty payment may either be transferred automatically to the copyright owner and/or licensee, or credited to an account for later transfer, in either event accurate and rapid royalty accounting is made possible.

The payment means may include a key pad configured to accept an identification code linked to an account to which the transaction may be debited.

The computer terminal may include a card reader for accepting payment by banking cards, such as credit cards, debit cards, savings cards, and the like.

The data carrier may be a single or multiple use recordable data carrier.

The data carrier may include key means, for example, a hardware or software key linked to a microprocessor. The data carrier may thus be activated and deactivated for receiving data and/or releasing data by means of the key means.

The data dispensing device may be provided with a verification mechanism for verifying the authenticity of the key means.

The key means may be located on the data dispensing device and a code may be required to authenticate a user. The key means may be in the form of a code at a remote location, the data dispensing device being communicable with the remote location for verification of the code input by a user at the data dispensing device.

Equally the verification mechanism and/or the key means may be at least partially located on the data depot.

The recordable data carrier may be configured to receive data only from a data dispensing device authorised for a particular data carrier or a particular class of data carrier.

The recordable data carrier may be configured to be read by a data carrier reader authorised for a particular data carrier or a particular class of data carrier.

However, the recordable data carrier may be configured for receiving data from certain authorised data dispensing devices but to be read by any suitable reader, for example, a home entertainment centre.

The recordable data carrier may be configurable, through the data recorded thereon or otherwise, to permit reading of the data stored thereon for a predetermined period of time only, whereafter the data is either marked as stale and later deleted, or deleted immediately.

The above function may be controlled from a remote location by radio, satellite, data or telephone cable, or the like. This functionality will permit the so called renting of data, rather than purchasing the use thereof for an indefinite period, and is particularly suited to games, music and video data.

According to a second aspect of the invention, there is provided a method of vending data, the method including:

storing data to be vended;

dispensing desired data packages from the depot;

recording the dispensed data to a data carrier; and databasing details of the record carrier.

According to a further aspect of the invention there is provided a vending booth including a data dispensing device in communication with a data depot, the data dispensing device being configured for dispensing data to a recordable data carrier configured for recording data from the data dispensing device and for exchanging data regarding the dispensed data with a database for storing user information for each recordable data carrier.

The booth may include electronic payment means in the form of a card or token reader configured to debit an account of a user responsive to the dispensing of data from the data dispensing device on the recordable data carrier.

The booth may be in the form of a vending machine type apparatus, similar to those currently used for other transactions.

The data dispensing device of the booth may be in the form of a computer terminal having a user interface, a data writer configured for use with the data carrier, and a communication device for permitting data transfer communication with the data depot by means of one or more data transfer means selected from the group comprising of dedicated data lines, optic fibre cables, telephone lines, satellite link-up, radio transmission, or broadband cable.

DESCRIPTION OF THE DRAWINGS

The invention will now be described, by way of example only, with reference to the accompanying flow diagram.

A data vending system 10, broadly in accordance wit the invention, includes the storing data, such as digitised music and/or video and/or computer programs on one or more main computer i.e. the data depot 12. The data on the data depot 12 being indexed to be searchable in terms of index number, name of author, name of producer, title, content, cost, duration, theme, or the like.

Figure 1:
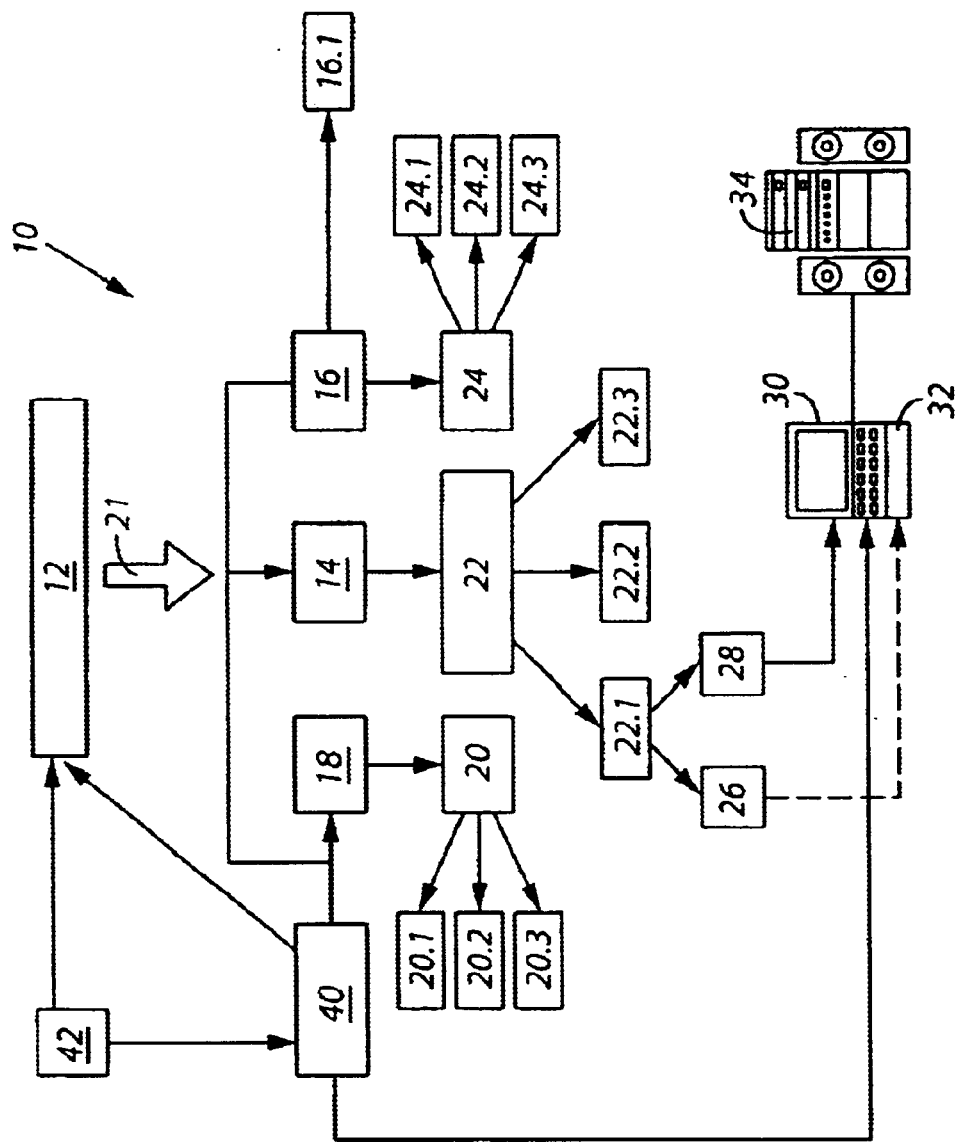

The data on the data depot 12 includes a database 40 which maintains owner and/or possessor records for each said data carrier 30, the data being selected from the group including ownership or possession history of the data carrier, personal details of the past and present owner and/or possessor of the data carrier, demographic data about the user/owner of the data carrier, data recorded onto the data carrier at an authorised data dispensing device (either cumulatively or periodically, by title, by artist, etc), data rented and the rental period (either cumulatively or periodically, by title, by artist, etc), the user's normal requirements, the user's payment records, royalties paid to the copyright owner by the user, and favourite data of the user.

One or more vendors 14, 16, 18, at locations remote to the main computer of the data depot 12, are provided with data dispensing devices 20, 22, 24, able to communicate with the main computer by satellite link-up, by telephone or data line, by radio, or the like 21. The dispensing devices will typically be in the form of a local file server having a number of server stations 20.1, 20.2, 20.3, 22.1, 22.2, 22.3, 24.1, 24.2, 24.3, or terminals where a customer can search the depot 12 index and select data of his or her choice. Each item selected will have a code and a price.

In another version, the index of the depot 12 is searchable from the data carrier 30 by providing the data carrier 30 with a search engine which interfaces with the index of the depot 12.

Thus a list of selections will have an overall price, including royalties, taxes, etc, which the user tenders.

The terminal may include payment means such as a card reader 26 for accepting payment by banking cards, such as credit cards, debit cards, savings cards, and the like.

The terminal 20.1, 20.2, 20.3, 22.1, 22.2, 22.3, 24.1, 24.2, 24.3, is provided with data writing means 28 for writing data to a data carrier 30.

The terminal 20.1, 20.2, 20.3, 22.1, 22.2, 22.3, 24.1, 24.2, 24.3, is configured to download data from the depot 12 and transfer them to the data carrier 30 with or without storing it locally on the terminal 20.1, 20.2, 20.3, 22.1, 22.2, 22.3, 24.1, 24.2, 24.3, for later retrieval.

The data carrier 30 may be a single or multiple use recordable data carrier, such as a removable hard disk, a CD-ROM, a DVD, flash memory, an eeeprom, or the like.

One envisaged embodiment is a cassette holding a number of CD-ROMs and a controller for performing the other functions, and managing the data on the CD-ROMs.

The data carrier 30 includes key means 32, for example, a hardware or software key linked to a microprocessor. The data carrier 30 is thus activated and deactivated for receiving data by means of the key means 32. Typically this functionality will be performed with the use of PIN (Personal Identification Numbers) or passwords, or the like, cell-phone fashion.

The data dispensing device 20, 22, 24 and/or the data depot 12 is provided with a verification mechanism for verifying the authenticity of the key 32.

The recordable data carrier 32 is configured to receive data only from a data dispensing device 20, 22, 24, authorised for a particular data carrier 32 i.e. at the premises of an authorised vendor 14, 16, 18, and to be read by any suitable reader, for example, a home entertainment centre 34.

Once a selection has been paid for the data corresponding to that selection is downloaded from the main computer of the data depot 12, via the terminal 20.1, 20.2, 20.3, 22.1, 22.2, 22.3, 24.1, 24.2, 24.3, onto the data carrier 30 and a royalty payment to the copyright owner and/or licensee, which is included in the transaction amount, is transferred to or credited to the account of said copyright owner and/or licensor either automatically at the time of the transaction or later.

The vendor 14, 16, 18 thus does not require large data storage facilities, nor as with conventional record bars, video shops and software outlets, large stock holding tying up floor space and capital. A vendor 16 may provide one or more vending booths 16.1, which may be in the form of a vending machine type apparatus, similar to those currently used for other transactions. The booth can include the data dispensing device and payment means.

The recordable data carrier 30 is configurable, through the data recorded thereon or otherwise, to permit reading of the data stored thereon for a predetermined period of time only, whereafter the data is either marked as stale and later deleted, or deleted immediately. The above function is monitored from the dispensing terminal 20.1, 20.2, 20.3, 22.1, 22.2, 22.3, 24.1, 24.2, 24.3, and requires periodic communication with a terminal 20.1, 20.2, 20.3, 22.1, 22.2, 22.3, 24.1, 24.2, 24.3, to keep the data carrier alive. This permits tight control to be exercised over the copyright in the data on the data carrier 30 as any unauthorised data on the data carrier 30 can be deleted by the terminal 20.1, 20.2, 20.3, 22.1, 22.2, 22.3, 24.1, 24.2, 24.3, during the periodic communication.

This functionality permits the so called renting of data, rather than purchasing the use thereof for an indefinite period, and is particularly suited to music and video data as well as ensuring regular contact between the vendor and the user for sales purposes.

Thus, a copyright owner 42 may access the database 40 to determine the royalties collected so far and due to him, the client base he has, changing trends, and the like.

Likewise a user of the system who owns or is in authorised posession of one or more data carrier 30 may access the data base 40 determine which data he has paid for and is entitled to, how his preferences have changed with time, and the like. This is possible even if there are several data carriers 30 linked to the single user since the database 40 links the data carriers of a user to that user. Furthermore, in the event of theft or loss of one or more data carrier, the system will allow the lost or stolen data carrier to be scrambled, deleted, disabled, or otherwise made inoperative from a remote location or when such a data carrier 30 is next presented for recording of further data at a terminal 20.1, 20.2, 20.3, 22.1, 22.2, 22.3, 24.1, 24.2, 24.3, while the rightful owner or possessor is able to re-record the lost data at said terminal without further payment or at reduced cost.

The database 40 may be stored on the data depot 12, on the data dispenser 20.1, 20.2, 20.3, 22.1, 22.2, 22.3, 24,1, 24.2, 24.3, on the data carrier 30, or on a combination of any of the aforementioned i.e. a decentralised database.

The inventor envisages that the system could be operated as a franchise operation with a main computer operator i.e. the wholesaler, and a number of vendors i.e. the retailer, much like present record bars and the like.

The inventor believes that the invention is advantageous in that it will permit a user who has once purchased some data, and has subsequently lost the data carrier or who has deleted the relevant data, to re-record the data without repurchasing it.

Furthermore, the inventor believes that it is an advantage of the invention that a user can purchase or rent the data e.g. music, video etc. for a predetermined period of time, and pay therefor accordingly with the copyright owner being credited with royalties accordingly.

What is claimed is:

1. A data vending system including:
    a data depot for storing one or more data types selected from the group consisting of digitized music, analog music, video, games, information, and computer programs;
    a data dispensing device in communication with the data depot;
    a uniquely identifiable recordable data carrier configured for recording data from the data dispensing device;
    a database for keeping a record of the data recorded by a user onto said data carrier, at least a part of which database is stored remotely from said data carrier,
    wherein the database also maintains at least one of owner and possessor records for each said data carrier selected from the group consisting of ownership history of the data carrier, possession history of the data carrier, personal details of the past and present owner and possessor of the data carrier, demographic data about the user and owner of the data carrier, data recorded onto the data carrier at an authorized data dispensing device, data rented and the rental period, the user's normal requirements, the user's payment records, royalties paid to the copyright owner by the user, and favorite data of the user;
    wherein the data carrier is a multiple use recordable data carrier which includes key means for at least one function selected from activating the data carrier for receiving data, deactivating the data carrier for receiving data, activating the data carrier for releasing data, and deactivating the data carrier for releasing data, wherein the key means includes at least one of a hardware key and a software key linked to a microprocessor operatively associated with a data carrier; and
    wherein the data dispensing device is provided with a verification mechanism for verifying the authenticity of the key means.

2. A data vending system including:
    a data depot for storing one or more data types selected from the group consisting of digitized music, analog music, video, games, information, and computer programs;
    a data dispensing device in communication with the data depot;
    a uniquely identifiable recordable data carrier configured for recording data from the data dispensing device;
    a database for keeping a record of the data recorded by a user onto said data carrier, at least a part of which database is stored remotely from said data carrier,
    wherein the database also maintains at least one of owner and possessor records for each said data carrier selected from the group consisting of ownership history of the data carrier, possession history of the data carrier, personal details of the past and present owner and possessor of the data carrier, demographic data about the user and owner of the data carrier, data recorded onto the data carrier at an authorized data dispensing device, data rented and the rental period, the user's normal requirements, the user's payment records, royalties paid to the copyright owner by the user, and favorite data of the user;

wherein the recordable data carrier is configured to be read only by a data carrier reader authorized for a particular data carrier or a particular class of data carrier.

3. A data vending system including:

a data depot for storing one or more data types selected from the group consisting of digitized music, analog music, video, games, information, and computer programs;

a data dispensing device in communication with the data depot;

a uniquely identifiable recordable data carrier configured for recording data from the data dispensing device;

a database for keeping a record of the data recorded by a user onto said data carrier, at least a part of which database is stored remotely from said data carrier, wherein the database also maintains at least one of owner and possessor records for each said data carrier selected from the group consisting of ownership history of the data carrier, possession history of the data carrier, personal details of the past and present owner and possessor of the data carrier, demographic data about the user and owner of the data carrier, data recorded onto the data carrier at an authorized data dispensing device, data rented and the rental period, the user's normal requirements, the user's payment records, royalties paid to the copyright owner by the user, and favorite data of the user;

wherein the recordable data carrier is configured to permit or prohibit the reading of data recorded thereon or the recording of data thereon by a code which is altered periodically when the data carrier is in data communication with the data depot or the data dispensing device.

4. A data vending system including:

a data depot for storing one or more data types selected from the group consisting of digitized music, analog music, video, games, information, and computer programs;

a data dispensing device in communication with the data depot;

a uniquely identifiable recordable data carrier configured for recording data from the data dispensing device;

a database for keeping a record of the data recorded by a user onto said data carrier, at least a part of which database is stored remotely from said data carrier, wherein the database also maintains at least one of owner and possessor records for each said data carrier selected from the group consisting of ownership history of the data carrier, possession history of the data carrier, personal details of the past and present owner and possessor of the data carrier, demographic data about the user and owner of the data carrier, data recorded onto the data carrier at an authorized data dispensing device, data rented and the rental period, the user's normal requirements, the user's payment records, royalties paid to the copyright owner by the user, and favorite data of the user;

wherein the recordable data carrier is configurable to permit reading of the data stored thereon for a predetermined period of time only, whereafter the data is processed in at least one way selected from marked as stale and later deleted, deleted immediately, and scrambled.

5. A data vending system as claimed in claim 4, wherein the processing of the data is initiated from a remote location by at least one of radio, satellite, data cable, and telephone cable.

6. A vending booth for use with a data vending system comprising:

a data depot for storing one or more data types selected from the group consisting of digitized music, analog music, video, games, information, and computer programs;

a data dispensing device in communication with the data depot;

a uniquely identifiable recordable data carrier configured for recording data from the data dispensing device;

a database for keeping a record of the data recorded by a user onto said data carrier, at least a part of which database is stored remotely from said data carrier; wherein the database also maintains at least one of owner and possessor records for each said data carrier selected from the group including ownership history of the data carrier, possession history of the data carrier, personal details of the past and present owners and possessors of the data carrier, demographic data about the users and owners of the data carrier, data recorded onto the data carrier at an authorized data dispensing device, data rented and the rental period, the user's normal requirements, the user's payment records, royalties paid to the copyright owner by the user, and favorite data of the user, the vending booth including a data dispensing device in communication with the data depot, the data dispensing device being configured for dispensing data to an authorized recordable data carrier configured for recording data from the data dispensing device and for exchanging data regarding the dispensed data with a database for storing user information for each recordable data carrier.

7. A vending booth as claimed in claim 6, wherein the booth includes electronic payment means in the form of a card or token reader configured to debit an account of a user responsive to the dispensing of data from the data dispensing device on the recordable data carrier.

8. A vending booth as claimed in claim 6, wherein the data dispensing device is in the form of a computer terminal having a user interface, a data writer configured for use with the data carrier, and a communication device for permitting data transfer communication with the data depot by means of one or more data transfer means selected from the group consisting of dedicated data lines, optic fiber cables, telephone lines, satellite link-up, radio transmission, and broadband cable.

* * * * *